Figure 1:
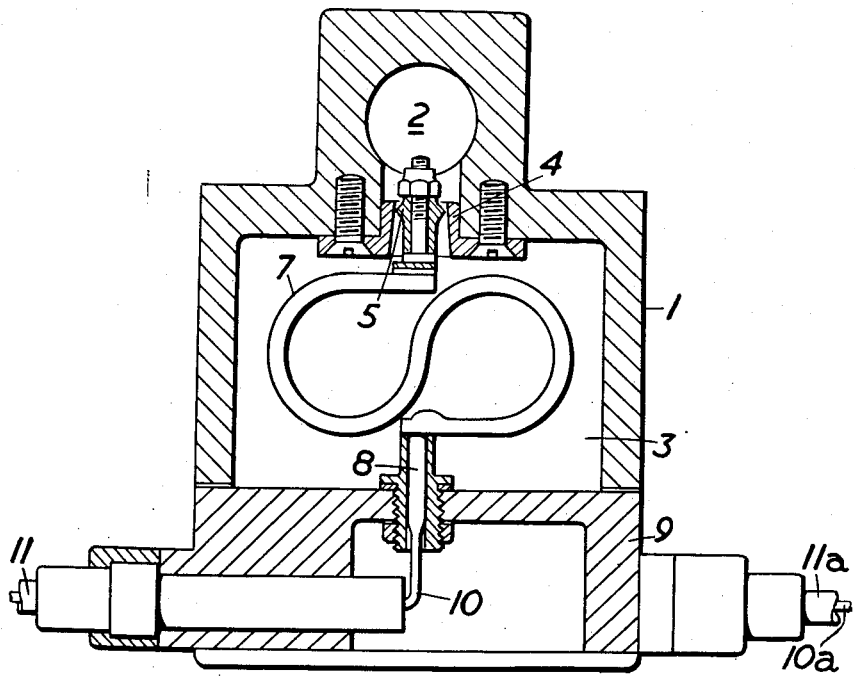

Oct. 23, 1956  J. O. P. HUGHES ET AL  2,767,739
TEMPERATURE RESPONSIVE MODULATING VALVES
Filed Sept. 13, 1954  2 Sheets-Sheet 1

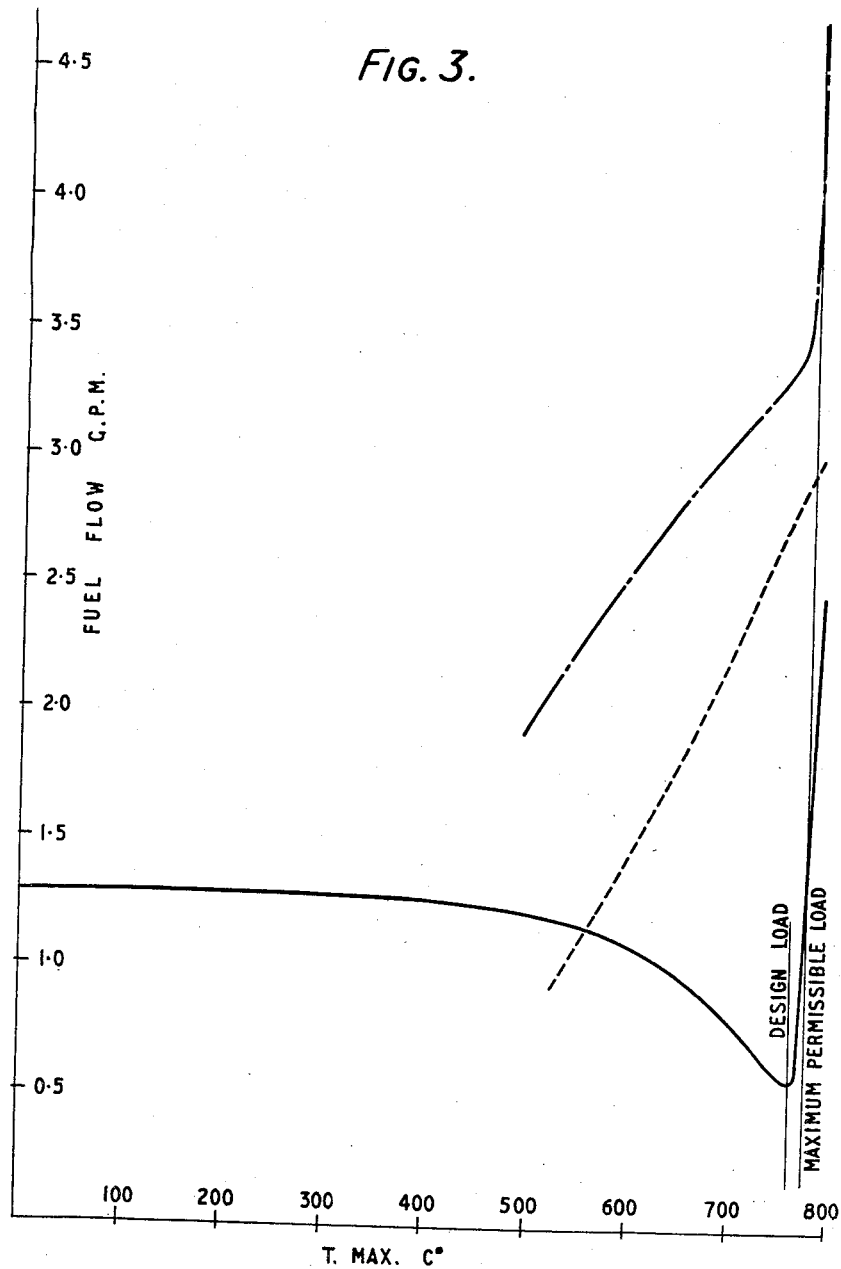

United States Patent Office 2,767,739
Patented Oct. 23, 1956

---

2,767,739

TEMPERATURE RESPONSIVE MODULATING VALVES

John Oliver Philip Hughes and Roy Starmer, Leicester, England, assignors to The English Electric Company Limited, Kingsway, London, England, a British company Application September 13, 1954, Serial No. 455,707

Claims priority, application Great Britain October 14, 1953

4 Claims. (Cl. 138—46)

The invention relates to a temperature responsive modulating valve, for example for regulating and eventually shutting off the fuel supply to a gas turbine engine when the inlet temperature thereof exceeds a predetermined value. When the gas turbine engine is provided with spill burners, the shutting off may be effected by the modulating valve throwing open the spill line which is normally kept at a low superatmospheric pressure to atmospheric pressure or to the inlet pressure of the fuel pump. A gas turbine fuel system of this kind, incorporating a modulating valve according to the present invention is described in our copending U. S. patent application Serial No. 455,706, filed on September 13, 1954, by John Oliver Philip Hughes et al. and assigned to The English Electric Co. Ltd. of London (Great Britain).

According to the invention a Bourdon tube fixed at one end carries at its free end a valve body having a circular knife edge, which is movable in a tubular nozzle arranged between the pressure side and the relief side of the fluid controlled by the said modulating valve so as to leave normally an annular gap between the said knife edge and the said tubular nozzle through which a restricted quantity of the fluid can flow and which constitutes a barrier between the pressure side and the relief side of the valve.

The said Bourdon tube is in operative communication with a temperature sensitive expansible medium, and moves the said valve body axially in the said tubular orifice in response to the expansion of the said medium.

When the expansion thereof exceeds a predetermined value, the Bourdon tube is deformed so far that the valve body emerges from the said tubular nozzle and throws a wide area open to the fluid from the pressure side to the relief side whereby the pressure on the pressure side is reduced to substantially the value on the relief side of the valve.

In certain applications, for example as a temperature responsive control for the fuel supply of spill burners of a gas turbine engine, it is desirable to increase the pressure on the pressure side of the modulating valve with increasing temperature until a predetermined maximum temperature is reached at which the pressure is to be suddenly relieved.

According to a development of the invention this is attained by making the said tubular nozzle tapering towards the end from which the valve body emerges with its circular knife edge when effecting the tripping action.

Thereby the annular gap is firstly progressively narrowed and the pressure difference between the pressure side and the relief side correspondingly increased, before a sudden relief of pressure is effected.

The expansible medium acting inside the Bourdon tube is preferably mercury supplied from a mercury boiler in operative communication with the said Bourdon tube through a capillary tube and exposed to the temperature to be controlled, for example to the temperature at the inlet to turbine. So long as this temperature is below the boiling point of mercury the liquid mercury expands freely when it does not completely fill the capillary and Bourdon tube. When it completely fills them it expands the latter at the rate of expansion of the heated part of the liquid mercury i. e. comparatively little. As soon as, however, the temperature to be controlled exceeds the boiling point of mercury, the mercury vapours developing expand the Bourdon tube at a comparatively higher rate which e. g. at 650° C. increases rapidly, operating the modulating valve in the manner described.

In a gas turbine plant having more than one combustion chamber the temperature control is duplicated, providing for each combustion chamber one modulating valve arranged in parallel to the other modulating valve or valves, so that the trip is operated by whichever combustion chamber exceeds a predetermined inlet temperature.

Figure 2:
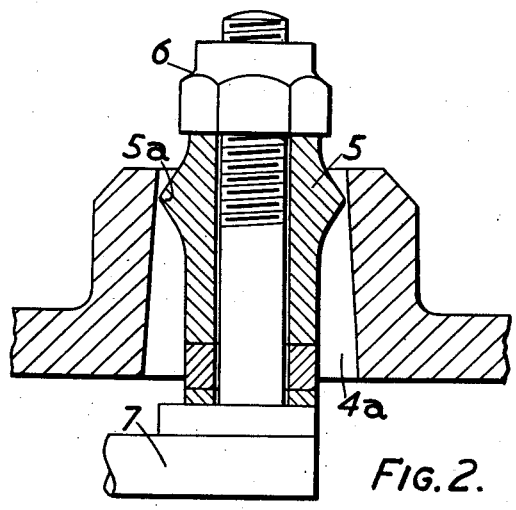

In order that the invention may be clearly understood and readily carried into effect, an embodiment thereof will now be described by way of example with reference to the accompanying drawings in which:

Fig. 1 is a sectional elevation of a modulating valve assembly according to the invention, Fig. 2 is a detail of Fig. 1 on a larger scale, and Fig. 3 is a graph, in which the fuel flow of a gas turbine engine, having spill burners and a temperature responsive modulating valve, is plotted over the temperatures at the gas turbine inlet.

Referring first to Figs. 1 and 2, the valve casing 1 has a pressure compartment 2 and a relief compartment 3 separated from one another by a nozzle 4 in which a valve body 5 is axially movable.

The pressure compartment 2, is for example connected to the spill line, and the relief compartment 3 to the fuel tank or fuel pump intake of a gas turbine engine having spill burners. This valve body 5 has a circular knife edge 5a (Fig. 2) which leaves an annular gap between its circumference and the bore 4a of the nozzle 4. This bore is preferably conical, so that by the axial movement of the valve body 5 the width, and accordingly the free cross section area of the said annular gap is varied.

The valve body 5 is fixedly attached by means of a nut 6 to the free end of a Bourdon tube 7, the other end of which is fixed to an adapter 8 mounted in the base 9 of the valve casing. This Bourdon tube is shown to be S-shaped but this feature does not form part of the present invention.

Through this adapter 8 the interior of the Bourdon tube 7 is put in communication with a capillary tube 10 which is connected to a mercury boiler (not shown) arranged in the inlet of a gas turbine engine.

In the case of a gas turbine plant having more than one, say two combustion chambers, the device described may be duplicated, with two or more nozzles 4 arranged in parallel between the pressure compartment 2 and the relief compartment 3. Another nozzle is then controlled by a separate valve body and Bourdon tube connected by another capillary 10a to a mercury boiler arranged in the outlet of the other combustion chamber. The capillaries 10, 10a are protected by tubes 11, 11a, respectively.

Referring now to Fig. 3, the full line indicates the spill flow from the spill burners of a gas turbine engine, the dotted line indicates the quantity of fuel burned (engine flow) and the chain-dotted line indicates the total flow of fuel through a throttle upstream of the burners (throttle flow) which is the sum of the spill flow plus engine flow.

The operation of the modulating valve is as follows:

Up to a turbine inlet temperature of 300° the mercury pressure is negligible, and the spill flow is constant. With rising temperature the mercury pressure rises gradually, expands the Bourdon tube 7 more and more, and pushes the valve body 5 deeper and deeper into the tapering bore 4a of the nozzle 4, whereby the annular gap between the circular knife edge 5a and the bore 4a of the nozzle is reduced.

Accordingly the spill flow (full line) is reduced and, owing to this and the adjustment of a higher throttle flow (chain-dotted line), the engine flow, which is the difference between throttle flow and spill flow, is increased as shown in the dotted line of the graph of Fig. 3.

At a temperature of e. g. 760° C., which corresponds to design load the knife edge 5a reaches a position just at the narrowest diameter of the bore 4a, and the spill flow reaches a minimum. This decrease in spill flow gives a desirable reduction in the burner pressure at full load while ensuring the desired high engine flow at this stage. Any further rise in temperature causes an expansion of the Bourdon tube 7 to such an extent that the valve body 5 is pushed with its circular knife edge 5a right out of the bore 4a whereby the cross section area available to the spill flow is increased.

While the knife edge 5a just begins to emerge from the narrow end of the bore 4a this increase in area is still limited and at maximum permissible load condition which is reached at e. g. 775° C. the spill flow is still in the order of magnitude of the value adjusted for low temperatures.

Further increase in engine inlet temperature results in a rapid widening of the area available for the spill flow, and in a rapid increase of said spill flow; consequently any further fuel supplied by the fuel pump is by-passed through the spill and thereby the engine is protected from being overloaded.

When with falling inlet temperatures of the turbine engine the knife edge 5a of the valve body 5 is retracted by the contracting Bourdon tube 7 into the bore 4a of the nozzle 4, it returns again to its equilibrium condition at the design load i. e. to the left of the maximum permissible load condition in the graph of Fig. 3.

It will be noted that the total throttle flow has a positive characteristic throughout, a fact which ensures overall stability of control.

As stated hereinabove, we do not claim the S-shape of the Bourdon tube as illustrated in Fig. 1.

What we claim as our joint invention and desire to secure by Letters Patent, is:

1. A temperature responsive modulating valve device, for example for regulating and eventually shutting off the fuel supply to a gas turbine by throwing open a spill line when the inlet temperature of said gas turbine exceeds a predetermined maximum, comprising in combination: a valve casing having a pressure compartment and a relief side compartment, a valve body movably arranged in the said valve casing between the said pressure compartment and relief side compartment controlling the cross section area available for communication between the said two compartments, a Bourdon tube fixed at one end to the said casing and at the other end to the said valve body, a heat responsive element exposed to the temperature reacted to by the said valve and having a hollow body containing a temperature sensitive expansible medium, and a tube directly connecting the interior of the said hollow body to the interior of the said Bourdon tube.

2. A temperature responsive modulating valve device, for example for regulating and eventually shutting off the fuel supply to a gas turbine by throwing open a spill line when the inlet temperature of said gas turbine exceeds a predetermined maximum, comprising in combination: a casing having a pressure compartment and a relief side compartment, a tubular nozzle arranged between the said two compartments, a valve body having a circular knife edge axially movable within this tubular nozzle leaving a circular gap between its knife edge and the said tubular nozzle, a Bourdon tube arranged in the said casing, at its open end fixed thereto and in communication with a temperature sensitive expansible medium exposed to the temperature to be reacted upon, and at its closed free end carrying the said valve body and when expanded by the said temperature sensitive expansible medium moving the said valve body co-axially within the said tubular nozzle and, upon reaching the said predetermined temperature, moving the said circular knife edge out of the said tubular nozzle, throwing open thereby a considerably increased annular area to the flow from the said pressure compartment to the said relief compartment.

3. A valve device as claimed in claim 2, wherein the said tubular nozzle tapers off to a restricted diameter towards its exit, whereby the area of the said annular gap is firstly progressively reduced before being suddenly considerably increased as the said valve body is axially moved by the expansion of the said Bourdon tube.

4. A valve device as claimed in claim 2, wherein the said temperature sensitive expansible medium is mercury, and comprising in addition: a mercury boiler exposed to the temperature to be reacted upon, and a capillary tube operatively putting the said mercury boiler into communication with the interior of the said Bourdon tube.

References Cited in the file of this patent

UNITED STATES PATENTS

| 2,421,713 | Porter | June 3, 1947 |
| 2,450,535 | Watson et al. | Oct. 5, 1948 |
| 2,610,466 | Ballantyne | Sept. 16, 1952 |